(12) United States Patent
Qian

(10) Patent No.: US 8,874,294 B2
(45) Date of Patent: Oct. 28, 2014

(54) SIMPLIFIED TOPOLOGY FOR TROLLEY ASSIST-CAPABLE ELECTRIC DRIVE TRUCK

(75) Inventor: Lewei Qian, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 220 days.

(21) Appl. No.: 13/487,455

(22) Filed: Jun. 4, 2012

(65) Prior Publication Data

US 2013/0325226 A1    Dec. 5, 2013

(51) Int. Cl.
*B60K 6/46*    (2007.10)
*B60L 11/08*    (2006.01)

(52) U.S. Cl.
USPC .............................. 701/22; 246/84; 246/226

(58) Field of Classification Search
CPC ....... B60K 6/46; B60L 11/08; B60L 2210/30; B60L 2210/40; B60Y 2200/92; B60Y 2400/212
USPC ........................................ 246/84, 226; 701/22
See application file for complete search history.

(56) References Cited

U.S. PATENT DOCUMENTS

| | | |
|---|---|---|
| 4,453,113 A | 6/1984 | Merlino et al. |
| 5,070,959 A | 12/1991 | Grabowski |
| 5,293,947 A | 3/1994 | Stratton |
| 5,466,998 A | 11/1995 | Kinoshita et al. |
| 6,646,360 B2 | 11/2003 | Brown |
| 8,505,464 B2 * | 8/2013 | Huber et al. .................... 105/49 |
| 2007/0164693 A1 | 7/2007 | King et al. |
| 2011/0094808 A1 | 4/2011 | Mazumdar et al. |
| 2011/0094841 A1 * | 4/2011 | Mazumdar et al. ......... 191/33 R |
| 2012/0212047 A1 * | 8/2012 | Sasaki et al. .................. 307/9.1 |

FOREIGN PATENT DOCUMENTS

| | | |
|---|---|---|
| DE | 102 56 705 A1 | 7/2004 |
| JP | 2001145208 | 5/2001 |
| WO | 0037279 | 6/2000 |

* cited by examiner

*Primary Examiner* — John Q Nguyen
*Assistant Examiner* — Anshul Sood

(57) ABSTRACT

A trolley assist-capable electric drive truck includes a DC link with first, second and third contactors that may be opened and closed in different configurations to operate the truck in different modes. In a normal propel mode, the three contactors are open and electrical power is routed from an onboard electrical power source to electric propulsion motors. During normal retard mode, the three contactors are closed to route electrical energy generated by the electric propulsion motors through a grid resistor of the DC link. In a trolley mode, the first and second contactors are closed, but the third contactor is open, and electrical power is routed from the trolley lines to the motors for propulsion, or in a reverse direction for retarding the truck.

11 Claims, 3 Drawing Sheets

SIMPLIFIED TOPOLOGY FOR TROLLEY ASSIST-CAPABLE ELECTRIC DRIVE TRUCK

TECHNICAL FIELD

The present disclosure relates generally to DC links for trolley assist-capable electric drive trucks, and more particularly to a DC link with three contactors having different configurations for propelling or retarding utilizing onboard or trolley electrical power.

BACKGROUND

Large scale mining of materials tends to be an energy intensive endeavor. In many open cast mines, a fleet of large mining trucks may operate almost continuously to transport ore and/or overburden from an extraction area to a dump or processing site. Many such mining trucks are operated via diesel powered engines using either a direct drive strategy or a diesel-electric drive system. As with many other heavy equipment systems, fuel costs for mining trucks can be substantial. Moreover, many mines are located in remote locations, and the costs associated with transporting fuel to the mine site can add significantly to the operational expense. Even obtaining sufficient fuel supplies can sometimes be challenging, regardless of cost. For these and other reasons, engineers in the mining industry and mining equipment manufacturers are continually searching for ways to reduce fuel consumption. Given the historical price volatility of commodities, of which mined materials and petroleum fuels are both examples, as well as variation in geology and topography among mine sites, the economics of supplying and consuming energy for mining activities tends to be complex and highly variable.

For decades, mine operators have experimented with the use of electrical power generated onsite or supplied from a utility grid, to power mining equipment. Onsite electrical power generation has similar costs and availability concerns to refueling equipment directly via petroleum fuels. Due to the remoteness of many mines and other factors, Supplying electrical power from a grid, even over relatively long distances, has proven consistently advantageous for at least some mines as compared to reliance on petroleum fuels alone. Electrical power costs can nevertheless vary due to market fluctuations, as well as varying from mine to mine depending upon regional availability of fossil fuels, geothermal or hydroelectrical power, or other native or obtainable sources of energy for electrical power generation. Thus, even where electrical powering of mining equipment is viable, there remains ample motivation to use it as efficiently as possible, both to control costs and optimize predictability in the face of uncertain economics.

While first proposed decades ago, one contemporary use of electrical power at mine sites is a trolley system having an overhead trolley line to provide electrical power to assist mining trucks, particularly when traveling loaded on uphill grades. Many open cast mines include a haul road extending from an extraction site for ore to a remote dumpsite or processing location. The mining trucks used at such sites may need to travel an uphill grade on a haul road that is several kilometers long, or possibly even longer. It will be appreciated that the use of diesel or other petroleum fuels, such as liquefied natural gas, to propel mining trucks loaded with literally hundreds of tons of ore up such grades can be quite costly, and thus trolley systems have received renewed interest in recent years. A typical mining truck may have at least four different modes of operation. Among these are utilizing onboard electrical systems for propelling or retarding motion of the truck, and trolley based propulsion or even trolley retarding in which electrical power generated by retarding the truck is fed back into the trolley grid. Facilitating all of these modes, and maybe others, can require a DC link topology with multiple different contactors that each can be put in either an open circuit configuration or a closed circuit configuration. For instance, U.S. Pat. No. 6,646,360 shows a DC link topology with at least five contactors to facilitate different operational modes.

The present disclosure is directed toward one or more of the problems set forth above and to providing simpler topology for DC links in certain mining trucks.

SUMMARY

In one aspect, a trolley assist-capable electric drive truck includes a plurality of ground engaging elements coupled to a frame. An onboard electrical power source is attached to the frame and includes an internal combustion engine mechanically coupled to an electrical power generator. At least one electric propulsion motor is coupled to the ground engaging elements. A circuit electrically connects the electrical power generator to the electrical propulsion motor. A pantograph is supported on the frame and is movable between a trolley line engagement configuration and a stowed configuration. A DC link is electrically connected between the circuit and the pantograph, and includes a first contactor electrically separating a positive direct current conductor from a positive pantograph conductor, and a second contactor electrically separating a negative direct current conductor from a negative pantograph conductor. The positive direct current conductor is electrically separated from the negative direct current conductor by the first contactor, a third contactor, a grid resistor and the second contactor. Each of the first, second and third contactors are changeable between an open circuit configuration and a closed circuit configuration.

In another aspect, a trolley DC link includes a first contactor electrically separating a positive direct current conductor from a positive pantograph conductor. A second contactor electrically separates a negative direct current conductor from a negative pantograph conductor. The positive direct current conductor is electrically separated from the negative direct current conductor by the first contactor, a third contactor, a grid resistor and the second contactor. Each of the first, second and third contactors are changeable between an open circuit configuration and a closed circuit configuration.

In still another aspect, a method of operating a trolley assist-capable electric drive truck includes propelling the truck in a normal propel mode by opening a first, second and third contactor of a DC link, and routing electrical energy from an onboard electrical power source to an electric propulsion motor coupled to ground engaging elements. The truck is propelled in a trolley propel mode by closing the first and second contactors, opening the third contactor and routing electrical energy from a pantograph through the DC link to the electric propulsion motor. The truck is retarded in a normal retard mode by closing all of the first, second and third contactors, and routing electrical energy from the electrical propulsion motor through a grid resistor of the DC link. The truck is retarded in a trolley retard mode by closing the first and second contactors, opening the third contactor and routing electrical energy from the electric propulsion motor through the DC link and off the truck through the pantograph.

DETAILED DESCRIPTION

Figure 1:
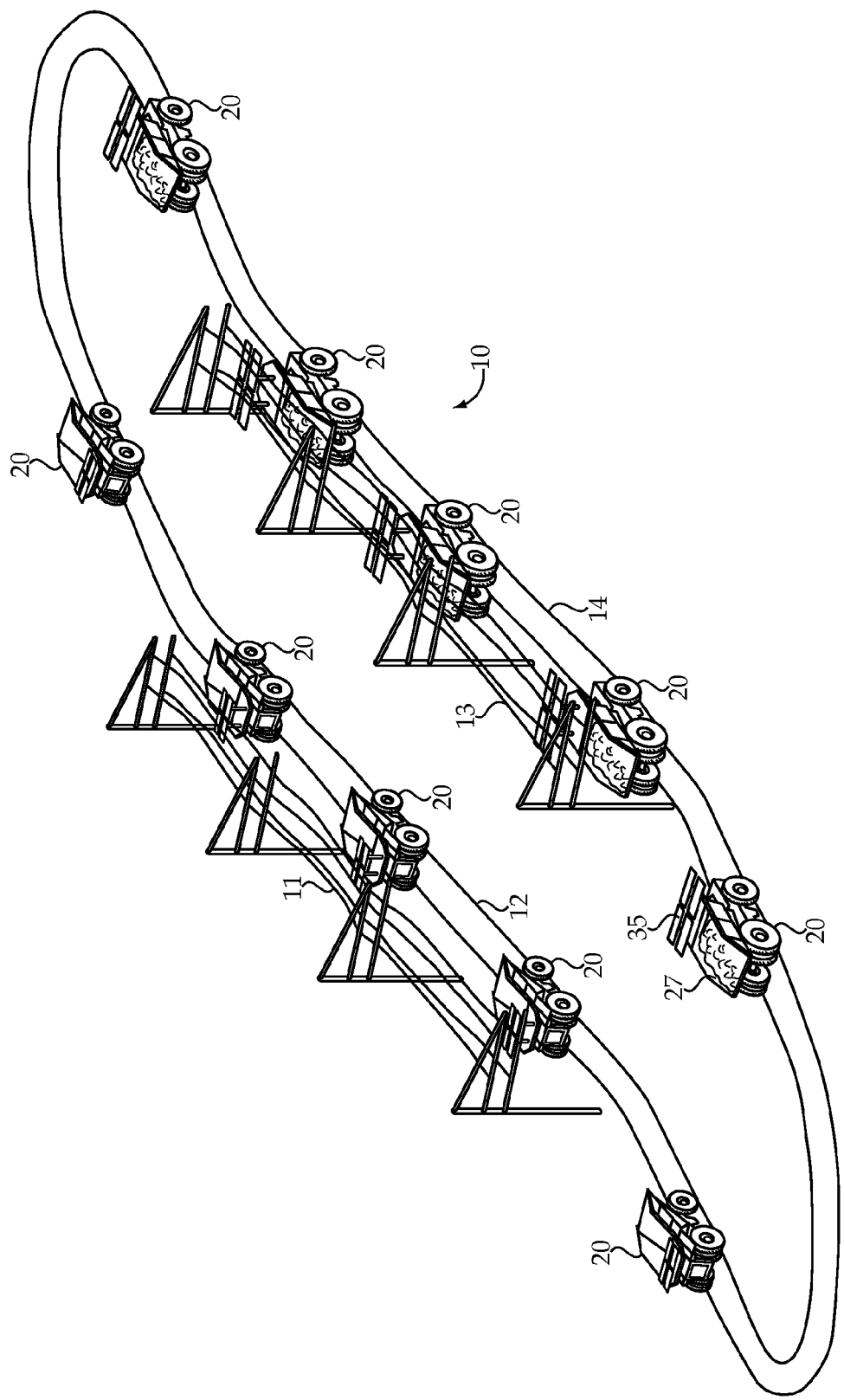
FIG. 1 is an aerial view of a mine site according to one aspect of the present disclosure.
Figure 2:
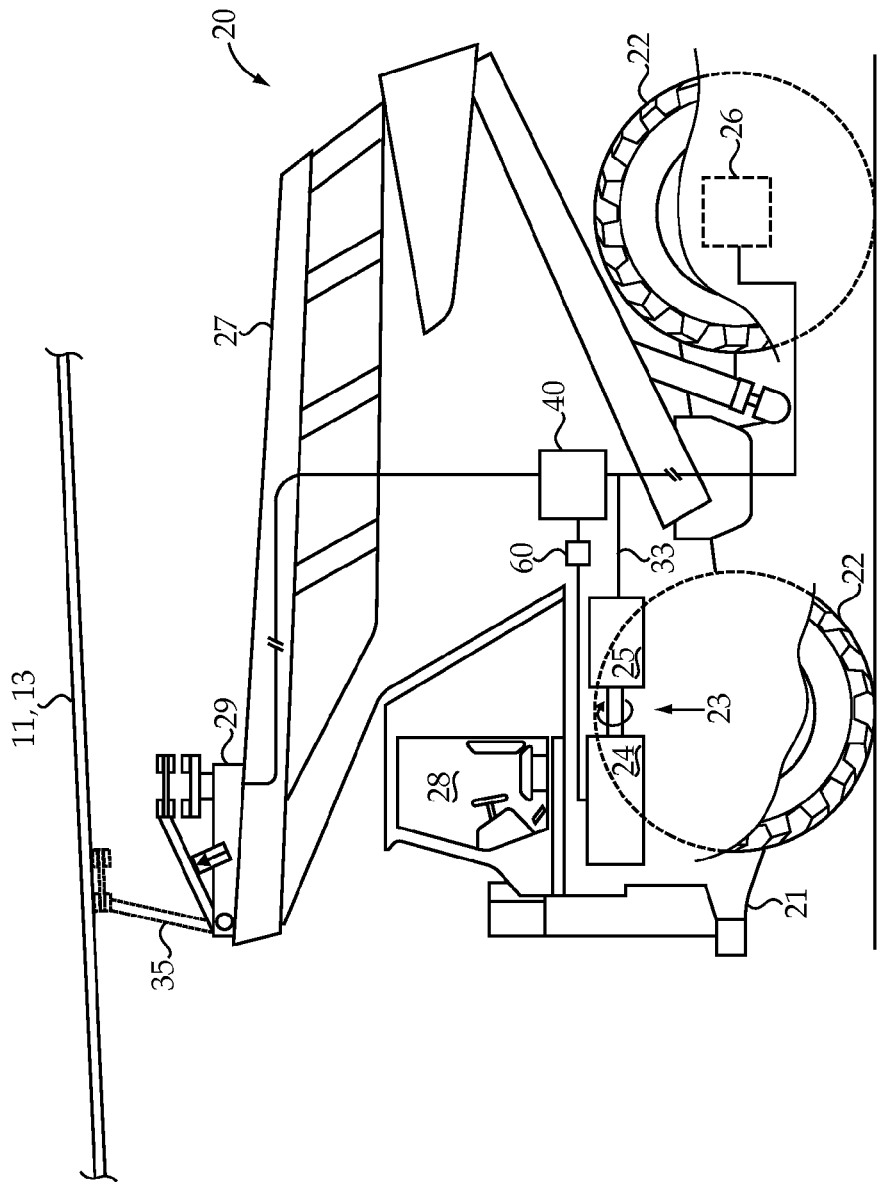
FIG. 2 is a side view of a trolley assist-capable electric drive truck according to the present disclosure.

Referring initially to FIGS. 1 and 2, a mine site 10 may include a downhill segment 12 and an uphill segment 14. In a typical situation, a plurality of trolley assist-capable electric drive trucks 20 travel the downhill segment 12 unloaded. At the low mine site location, the trucks may be filled with ore or overburden. After being loaded with the material in dump bed 27, the trucks 20 travel the uphill segment 14 to a processing site where the trucks are unloaded, and then repeat the circuit. In the illustrated mine site 10, both the downhill segment 12 and the uphill segment 14 each include a respective trolley line 11 and 13 that are connected to a local electrical grid (not shown) and/or public electrical grid lines. During the uphill segment 14, each truck 20 may utilize a pantagraph 35 to electrically connect the truck 20 to draw power from the trolley line 13. Thus, during the uphill segment, electrical power drawn from trolley 13 is utilized by each individual truck 20 to propel the truck uphill toward the dump or processing site. Although not necessary, the trucks may also connect to the trolley line 11 during the downhill segment, and the electrical propulsion motors 26 of the truck 20 may then act as electrical generators to feed electrical power back into the trolley line responsive to downhill travel of the truck as potential energy is converted into electrical energy.

Each trolley assist-capable electric drive truck 20 is built around a frame 21 and is supported on a plurality of ground engaging elements 22 coupled to the frame. In the illustrated embodiment, ground engaging elements 22 are tires, but other ground engaging elements, such as tracks, would also fall within the scope of the present disclosure. Each truck 20 includes an onboard electrical power source 23, which is attached to the frame 21 and includes an internal combustion engine 24 mechanically coupled to an electrical power generator 25. Internal combustion engine 24 may be a compression ignition engine that may be single fuel engine, or possibly a dual fuel engine that primarily utilizes natural gas that is ignited with a pilot charge of liquid diesel fuel. The onboard electrical power source 23 may be electrically connected to at least one electric propulsion motor 26 that is coupled to the ground engaging elements 22 by a circuit 33. A pantagraph 35 is supported on frame 21 and is movable between a trolley engagement configuration and a stowed configuration. When in a trolley engagement configuration, a DC link 40 of truck 20 is electrically connected to trolley line 11 or 13. When in the stowed configuration, the truck 20 is electrically disconnected from trolley lines 11 or 13. An electronic power controller 60 may be in control communication with DC link 40, and may also communicate with one or more other electronic controllers of truck 20 including an electronic engine controller for internal combustion engine 24. Electric drive trucks 20 are also typical in that they each include a dump bed 27 that may be moved between a hauling configuration as shown, or raised to a dump configuration. Finally, truck 20 includes an operator station 28.

Figure 3:
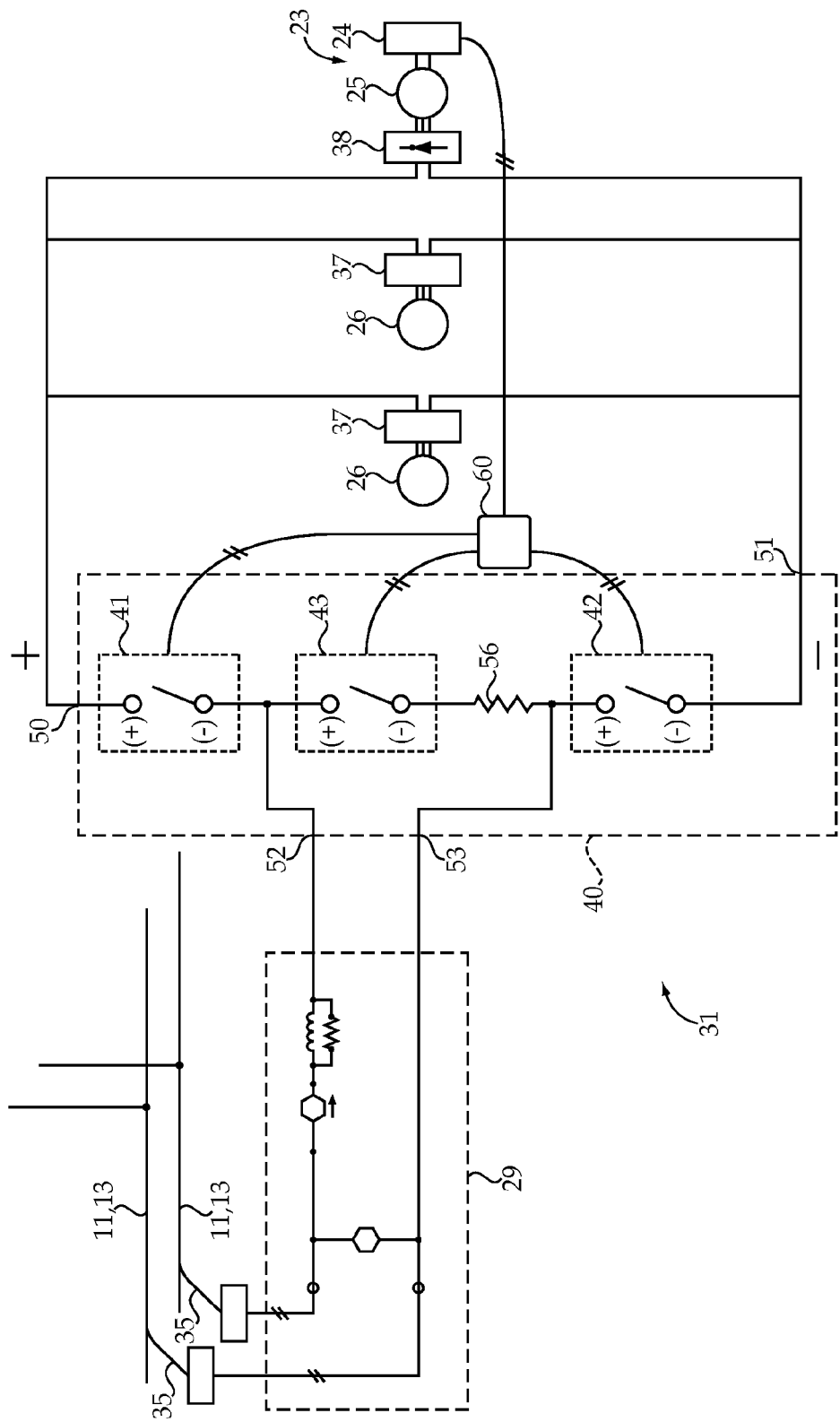
FIG. 3 is a schematic view of a DC link from the trolley assist-capable electric drive truck of FIG. 2.

Referring in addition to FIG. 3, each electric drive truck includes a simplified topology 31 with a DC link 40 having exactly three electrical contactors that may be opened and closed to make the necessary electrical connections to facilitate normal and trolley modes of propulsion and retarding of truck 20. In particular, DC link 40 is electrically connected between the circuit 33 and the pantagraph 35. DC link 40 includes a first contactor 41 electrically separating a positive direct current conductor 50 from a positive pantagraph conductor 52. A second contactor 42 electrically separates a negative direct current conductor 51 from a negative pantagraph conductor 53. The positive direct current conductor 50 is also electrically separated from the negative direct current conductor 51 by the first contactor 41, a third contactor 43, a grid resistor 56 and the second contactor 42. Each of the first, second and third contactors 41-43 are changeable between an open circuit configuration and a closed circuit configuration responsive to control signals from electric power controller 60. The pantagraph 35 may be electrically separated from the positive and negative pantagraph conductors 52, 53 by a trolley link 29, which may include voltage and current sensors that may communicate information to electric power controller 60 via communication lines (not shown). The positive and negative direct current conductors 50, 51 are shown electrically connected to two electric propulsion motors 26, (e.g., left and right side motors) via invertors 37 in a conventional manner. Likewise, the on-board electrical power source 23 is also electrically connected to the positive and negative direct current conductors 50, 51 via a rectifier 38 in a conventional manner. Electric power controller 60 may be in control communication with the first, second and third contactors 41-43. The electric power controller 60 may also be configured to execute a power routing algorithm that is configured to generate control signals for opening and closing the first, second and third contactors 41-43. The grid resistor 56 may be utilized as needed to convert electrical power into heat that is dissipated to the environment.

Truck 20 may be operated in a normal propel mode, a normal retard mode and a trolley propel mode. Although not necessary, the truck may also be equipped to operate in a trolley retard mode. During normal propel mode, electrical power is generated in the on-board electrical power source 23 and supplied to the electrical propulsion motor(s) 26 via circuit 33. During a normal retard mode, the electrical motor(s) 26 operate as generators to slow the motion of truck 20, such as when travelling on a downhill grade. When in this normal retard mode, the electrical power generated by motor(s) 26 is channeled through grid resistor 56 and dissipated to the environment as generated heat. In a trolley propel mode, electrical power to the electric propulsion motor(s) 26 is supplied from trolley line 11 or 13 through DC link 40 to the electrical propulsion motor(s) to propel truck 20. If trolley retard mode is available, electric propulsion motor(s) 26 again operate as generators and the electrical power they generate is routed through the pantagraph 35 to trolley line 11 or 13. The following table illustrates the power routing algorithm control commands for the first, second and third contactors 41-43 in the different available modes of operating truck 20.

| Contactor | Normal Propel | | Normal Retard | Trolley Propel | | Trolley Retard |
| --- | --- | --- | --- | --- | --- | --- |
| 41 | Open | Close | Close | Close | Close | Close |
| 42 | Open | Close | Close | Close | Close | Close |
| 43 | Open | Close | Close | Open | Close | Open |

As shown in the Table, the power routing algorithm is configured to generate normal propel mode control signals to open all of the first, second and third contactors 41-43 for propelling the truck 20 with the on-board electrical power source 23. In rare instances, the power routing algorithm may close the first, second and third contactors to regulate voltage from the on-board electrical power source 23. For instance, excess power from the on-board electrical power source 23 may be dissipated as heat through the grid resistor 56 when the truck briefly stops in normal propel mode before the internal combustion engine 24 and the electrical power generator 25 can be slowed to meet the reduced power demand from truck 20. The power routing algorithm may be configured to generate trolley propel mode control signals to close the first and second contactors and open the third contactor for propelling the truck 20 by routing electrical energy from the pantagraph 35, through the DC link 40 and into the electric propulsion motor(s) 26. Also on rare occasions, the power routing algorithm may close the third contactor 43 in order to regulate trolley line DC link voltage as needed. The power routing algorithm is configured to generate normal retard mode control signals to close the first, second and third contactors 41-43 for retarding the truck 20 by routing electrical energy from the electric propulsion motor(s) 26 through the grid resistor 56 of the DC link 40. In the event that truck is so equipped, the power routing algorithm may also be configured to generate trolley retard mode control signals to close the first and second contactors 41-42, and open the third contactor 43 for retarding the truck 20 by routing electrical energy from the electric propulsion motor(s) 26 through the DC link 40 and off the truck 20 through the pantagraph 35 to trolley line 11 or 13. Finally, the power routing algorithm may be configured to move the pantagraph 35 between the trolley line engagement configuration and the stowed configuration in order to electrically connect and disconnect, respectively, the truck 20 from the trolley line 11 or 13.

INDUSTRIAL APPLICABILITY

The present disclosure finds general applicability to any trolley assist-capable electric drive trucks. The present disclosure finds specific applicability for electric drive trucks utilized in mine sites equipped with onsite trolley lines that may be electrically connected and disconnected from respective trucks via on-board pantographs. Finally, the present disclosure is generally applicable to trolley assist-capable electric drive trucks that could benefit from a simplified topology with a lesser number of electrical contactors. In the present disclosure, the electric drive trucks have only three electrical contactors to facilitate the various different modes, which is distinctly less than the four or five or more electrical contactors associated with the topologies of the prior art.

Referring again to FIGS. 1-3, a method of operating a trolley assist-capable electric drive truck 20 may include propelling the truck 20 in a normal propel mode by opening the first, second and third contactors 41-43 of the DC link 40, and routing electrical energy from an on-board electrical power source 23 to an electric propulsion motor(s) 26 coupled to ground engaging elements 22. For instance, truck 20 may operate in a normal propel mode at and around the loading and unloading sites of the mine 10 where trolley power is not available for reasons well known in the art. When trolley power is available, such as when traveling the uphill grade 14, the truck 20 is propelled in a trolley propel mode by closing the first and second contactors 41-42, and opening the third contactor 43 to route electrical energy from the pantagraph 35, through the DC link 40 and to the electric propulsion motor(s) 26. When truck 20 is being maneuvered on a downhill grade, such as downhill segment 12, the truck may be operated in a normal retard mode by closing all of the first, second and third contactors 41-43, and routing electrical energy from the electric propulsion motor(s) 26 through the grid resistor 56 of the DC link 40 to dissipate the electrical energy as heat to the environment. Alternatively, and if available, the truck may be operated in a trolley retard mode by electrically connecting the pantagraph 35 to the available trolley line 11, such as on the downhill grade segment 12 and closing the first and second contactors 41-42 while opening the third contactor 43. When operating in the trolley retard mode, electrical energy is routed from the electric propulsion motor(s) 26 through the DC link 40 and off the truck 20 through the pantagraph 35. Truck 20 may transition from a normal propel mode to a trolley propel mode by moving the pantagraph 35 from the stowed configuration to the trolley line engagement configuration. This may occur as the truck maneuvers into the vicinity of one of the trolley lines 11 or 13. The truck may transition from a trolley propel mode to a normal propel mode by moving the pantagraph 35 back from the trolley line engagement configuration to the stowed configuration when leaving the areas of the mine equipped with available trolley line power. If available, the truck may transition from a normal retard mode to a trolley retard mode by moving the pantagraph from a stowed configuration to a trolley line engagement configuration. Likewise, the truck 20 may transition from a trolley retard mode to a normal retard mode by moving the pantagraph from the trolley line engagement configuration to the stowed configuration.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A trolley assist-capable electric drive truck comprising:
a frame;
a plurality of ground engaging elements coupled to the frame;
an onboard electrical power source attached to the frame and including an internal combustion engine mechanically coupled to an electrical power generator;
at least one electric propulsion motor coupled to the ground engaging elements;
a circuit electrically connecting the electrical power generator to the electric propulsion motor;
a pantograph supported on the frame and movable between a trolley line engagement configuration and a stowed configuration;
a DC link that electrically connects the circuit to the pantograph, and including a first contactor electrically separating a positive direct current conductor from a positive pantograph conductor; a second contactor electrically separating a negative direct current conductor from a negative pantograph conductor; the positive direct current conductor being electrically separated from the negative direct current conductor by the first contactor, a third contactor, a grid resistor and the second contactor; and each of the first, second and third contactors being changeable between an open circuit configuration and a closed circuit configuration.

2. The truck of claim 1 including an electronic power controller in control communication with the first, second and third contactors and including a power routing algorithm configured to generate control signals for opening and closing the first, second and third contactors.

3. The truck of claim 2 wherein the power routing algorithm is configured to generate normal propel mode control signals to open all of the first, second and third contactors for propelling the truck with the onboard electrical power source;

the power routing algorithm is configured to generate trolley propel mode control signals to close the first and second contactors and open the third contactor for propelling the truck by routing electrical energy from the pantograph through the DC link to the electric propulsion motor; and the power routing algorithm is configured to generate normal retard mode control signals to close the first, second and third contactors for retarding the truck by routing electrical energy from the electric propulsion motor through the grid resistor of the DC link.

4. The truck of claim 3 wherein the power routing algorithm is configured to move the pantograph between the trolley line engagement position and the stowed position.

5. The truck of claim 4 wherein the power routing algorithm is configured to generate trolley retard mode control signals to close the first and second contactors and open the third contactor for retarding the truck by routing electrical energy from the electric propulsion motor through the DC link and off the truck through the pantograph.

6. A DC link of a trolley assist-capable electric drive truck, comprising:
- a first contactor electrically separating a positive direct current conductor from a positive pantograph conductor,
- a second contactor electrically separating a negative direct current conductor from a negative pantograph conductor,
- the positive direct current conductor being electrically separated from the negative direct current conductor by the first contactor, a third contactor, a grid resistor and the second contactor; and
- each of the first, second and third contactors being changeable between an open circuit configuration and a closed circuit configuration.

7. A method of operating a trolley assist-capable electric drive truck that includes a plurality of ground engaging elements coupled to a frame; an onboard electrical power source attached to the frame and including an internal combustion engine mechanically coupled to an electrical power generator; at least one electric propulsion motor coupled to the ground engaging elements; a circuit electrically connecting the electrical power generator to the electric propulsion motor; a pantograph supported on the frame and movable between a trolley line engagement configuration and a stowed configuration; and a DC link that electrically connects the circuit to the pantograph, and including first contactor electrically separating a positive direct current conductor from a positive pantograph conductor; a second contactor electrically separating a negative direct current conductor from a negative pantograph conductor; the positive direct current conductor being electrically separated from the negative direct current conductor by the first contactor, a third contactor, a grid resistor and the second contactor; and each of the first, second and third contactors being changeable between an open circuit configuration and a closed circuit configuration, the method comprising the steps of:
- propelling the truck in a normal propel mode by opening the first, second and third contactor of the DC link and routing electrical energy from the onboard electrical power source to the electric propulsion motor coupled to the ground engaging elements;
- propelling the truck in a trolley propel mode by closing the first and second contactors and opening the third contactor and routing electrical energy from a pantograph through the DC link to the electric propulsion motor; and
- retarding the truck in a normal retard mode by closing all of the first, second and third contactors and routing electrical energy from the electric propulsion motor through a grid resistor of the DC link.

8. The method of claim 7 including the steps of:
- transitioning from the normal propel mode to the trolley propel mode by moving the pantograph from a stowed position to a trolley line engagement position; and
- transitioning from the trolley propel mode to the normal propel mode by moving the pantograph from the trolley line engagement position to the stowed position.

9. The method of claim 7 including a step of retarding the truck in a trolley retard mode by closing the first and second contactors and opening the third contactor and routing electrical energy from the electric propulsion motor through the DC link and off the truck through the pantograph.

10. The method of claim 8 including the steps of:
- transitioning from the normal retard mode to the trolley retard mode by moving the pantograph from a stowed position to a trolley line engagement position; and
- transitioning from the trolley retard mode to the normal retard mode by moving the pantograph from the trolley line engagement position to the stowed position.

11. The method of claim 7 including a step of regulating trolley line DC link voltage by closing the third contact while in trolley propel mode.

* * * * *

UNITED STATES PATENT AND TRADEMARK OFFICE
CERTIFICATE OF CORRECTION

| | | |
|---|---|---|
| PATENT NO. | : 8,874,294 B2 | Page 1 of 1 |
| APPLICATION NO. | : 13/487455 | |
| DATED | : October 28, 2014 | |
| INVENTOR(S) | : Lewei Qian | |

It is certified that error appears in the above-identified patent and that said Letters Patent is hereby corrected as shown below:

In the specification

Column 4, lines 38-39, delete "electric motor(s)" and insert -- electrical propulsion motor(s) --.

In the claims

Column 7, line 46, in Claim 7, delete "including first" insert -- including a first --.

Signed and Sealed this
Twenty-fourth Day of November, 2015

Michelle K. Lee
*Director of the United States Patent and Trademark Office*